UNITED STATES PATENT OFFICE.

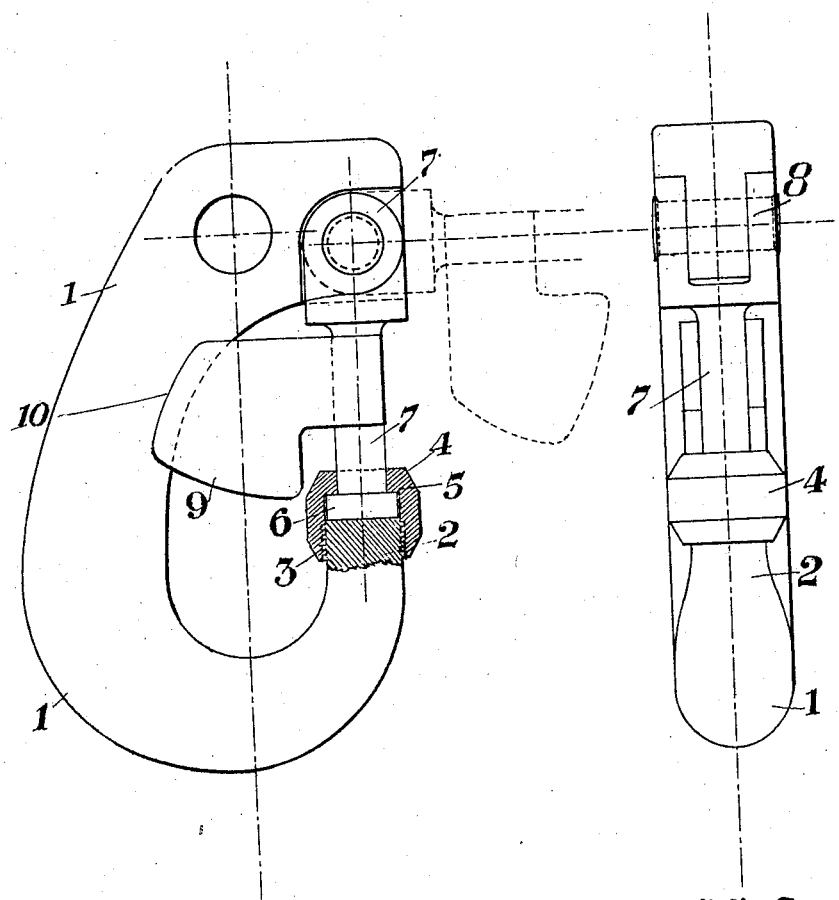

ROBERT MILTON STEVENSON, OF VICTORIA, BRITISH COLUMBIA, CANADA.

BULL-HOOK.

1,392,026.    Specification of Letters Patent.    Patented Sept. 27, 1921.

Application filed May 17, 1921. Serial No. 470,271.

*To all whom it may concern:*

Be it known that I, ROBERT MILTON STEVENSON, a citizen of the Dominion of Canada, residing at Victoria, in the Province of British Columbia, in the Dominion of Canada, have invented certain new and useful Improvements in Bull-Hooks, of which the following is a specification.

My invention relates to that class of massive safety hooks which are used as terminals of chains or ropes in connection with logging operations or the like, and has especial reference to the safety devices which are essential to that type of work, and which aim to combine the simplicity of a common hook with the safety and strength of an endless or solid link.

The object of my invention is to provide a bull hook of a thoroughly practical type, of simple construction, devoid of springs, sliding contacts or the like, one which facilitates operation and combines strength and safety in equal degrees.

I attain these objects by the following construction.

In the drawing, Figure 1, shows a side elevation of my invention and Fig. 2, shows a view at right angles to Fig. 1, or a front elevation.

The body of the hook 1 terminates at the point 2 which latter carries a substantial screw thread 3, and in connection with this thread is a massive nut 4, provided with an internal seating ring 5, which engages with the collar 6, this latter is formed on or secured to a substantial link 7, pivoting on the pin 8, attached to or forming an integral part of the link 7, is the keeper 9, which is grooved on its outer edge 10, so as to straddle the inner periphery of the hook body 1, the function of the keeper 9, is to relieve the link from excessive wedging strains which it would otherwise receive, and to transfer them in a measure to the more substantial side of the hook.

The link, pin, nut, and screw are so proportioned that there is little probability of the hook opening even under the most severe strain, and the protective character of the keeper 9, renders the liability to distortion of the link 7, when under strain practically impossible.

It will be seen that by a few turns of the nut the link 7, is free to swing over through an angle of say 90 degrees to the open position, giving ample accessibility to the hook as is shown by the dotted lines, also that when it is in the closed position it is effectively locked when the nut is replaced, and that when the nut is tightened up to the collar on the link 7, the latter is available to relieve the transverse strain on the body of the hook to the full extent of its tensile strength, and therefore minimize the liability of the hook to open under excessive strain, further that when the link is protected from distortion by accidental or excessive strain by the interference of the keeper 9, the probability of the device becoming jammed during operation is rendered extremely unlikely.

What I claim as my invention is:

A bull hook with a screw formed upon its point, in combination with a pivotal link having a collar on its end remote from the pivot, a nut to engage the said screw on the point of the hook, an internal seating ring within said nut to receive the said collar on the said link, a keeper secured to the link and extending across the inclosure formed by the hook, all substantially as explained and described.

ROBERT MILTON STEVENSON.

Witnesses:
W. D. GEAR,
I. STEWARD.